United States Patent [19]

Amberg

[11] 3,824,840

[45] July 23, 1974

[54] APPARATUS FOR TESTING AND SORTING CUPS

[75] Inventor: Ralph G. Amberg, Monticello, Ind.

[73] Assignee: Owens-Illinois, Inc., Toledo, Ohio

[22] Filed: Mar. 16, 1973

[21] Appl. No.: 342,179

Related U.S. Application Data

[63] Continuation of Ser. No. 140,545, May 5, 1971, abandoned.

[52] U.S. Cl. ............................................. 73/45.3
[51] Int. Cl. ............................................ G01m 3/04
[58] Field of Search ......... 73/45.3, 45.1, 37; 209/74

[56] References Cited
UNITED STATES PATENTS

| | | | |
|---|---|---|---|
| 3,389,811 | 6/1968 | Frank | 73/45.3 |
| 3,413,841 | 12/1968 | Weber | 73/45.3 |
| 3,461,716 | 8/1969 | Thomson | 73/45.3 |

*Primary Examiner*—Donald O. Woodiel

[57] ABSTRACT

A device for sorting relatively fragile cups manufactured from coated paper, thin plastic, foamed plastic material and the like. A nonporous, resilient, thin membrane is provided which has an annular contact area for receiving the rim area of the cup and establishing continuous contact with a cup surface extending around the cup adjacent the rim area in a closed loop. The membrane is fixedly supported only outside of and around at least one edge of the annular contact area, leaving the membrane movable throughout the contact area. Air impervious means spans the area defined by an inner edge of the annular contact area of the membrane. The air pressure on the cup-adjacent side of the air impervious element is reduced below the ambient air pressure to cause relative sealing movement of the annular contact area of the membrane and the closed loop surface of the cup received on the membrane. The pressure on the cup-adjacent side of the air impervious element is monitored to detect the presence or absence of a sealing contact between the membrane and the closed loop surface of the cup to sort good cups from defective cups.

22 Claims, 9 Drawing Figures

INVENTOR
RALPH G. AMBERG

BY Thomas A. Meehan
& E. J. Holler
ATTORNEY

3,824,840

APPARATUS FOR TESTING AND SORTING CUPS

This application is a continuation application of my copending application Ser. No. 140,545, filed May 5, 1971, now abandoned.

BACKGROUND OF THE INVENTION

Machines for testing and classifying hollow objects which are closed at one end have been known. For example, in U.S. Pat. No. 2,548,645 there is disclosed such a machine which utilizes a syringe for testing and classifying tubes. The syringe includes a cylinder with a piston slidably mounted therein and a closure cap for the cylinder mounted on one end. A hollow needle extends from the closure cap to receive a tube to be tested. An air passage is formed through the needle and the closure cap to the interior of the cylinder. When the piston is drawn away from the closure end of the cylinder, a suction or reduced air pressure is created inside a tube or at the end of the hollow needle. A resilient washer having a diameter smaller than the needle is slipped over the needle and held in a recess or groove around a periphery of the needle, with all of its lower surface supported and seated against the unyielding closure cap of the syringe. The mouth of the tube is mechanically pressed against the washer, and then is held against the resilient washer by the suction applied through the needle. If the tube does not have a defect which permits air to flow into the tube, the tube is held in place against the washer until released by movement of the piston toward the needle.

The nature of the material used for the washer was emphasized in the cited patent. It was noted therein that for soft rubbers of high quality that three thirty-seconds of an inch and upwards were suitable thicknesses for the seating. Thinner seatings or washers resisted the suction holding force too vigorously because the strain energy was concentrated in a smaller space between the mouth of the tube and the washer-supporting closure of the syringe, and the distortion force would rise to excessive proportions. Even so, a substantial initial mechanical force and holding suction force had to be exerted in order to form a successful seal between the washer and the mouth of the tube, because the washer was supported across its back by the closed end of the syringe. However, since that machine was not only testing for leaks in the tube but also for tubes with non-cylindrical mouths, the distortion of the washer resulting from the substantial forces was necessarily held to a minimum. Thus, a fixed support backing the entire washer area as provided by the closure cap of the syringe was required.

While devices of the type just described were satisfactory for the testing and sorting of tubes or other objects having sufficient rigidity to withstand the compression forces exercised, the testing of relatively fragile cups made from coated paper, thin plastic materials, foamed plastic materials and the like poses entirely different problems. In order for cup testing to be economical it must be performed at a very high rate of speed since the cost of an individual cup is much smaller than the cost of a glass test tube or other similar rigid article. Therefore, it is not possible to place the rim of a cup on a fixedly supported resilient seat as disclosed in the prior art and then gradually apply a suction to prevent the possibility of collapsing the cup. Moreover, because of the relatively fragile nature of the walls of such cups, the compression or suction force necessary to seat the rim on a fixedly supported washer cannot be exerted, since the force necessary to seat the rim may destroy the cup.

The rims of cups presently available are manufactured under close specifications. But a slight irregularity, for example, the lapped seam of a paper cup, or a slight bowing or departure from the definition of a plane by the cup rim, does not require that the cup be rejected as long as it does not leak elsewhere. Further, because the cups are relatively flexible an out-of-roundness, ovality, or eccentricity of a cup rim may be tolerated within a certain range during the testing process, since the circularity or regularness of the cup rim will be restored when the cups are packaged in a stacked arrangement during the packaging process. Therefore, any testing apparatus must be able to accommodate such irregularities and eccentricities without applying excessive force to the cups or rejecting such cups.

In order to overcome the problems set forth above the present cup testing methods and devices utilize periodically selected test samples of a run of cups to estimate quality of product being manufactured without testing each cup individually. These tests may include suction tests which destroy the cup being tested or standard liquid testing devices which use coffee or other solutions that spoil the cup for sale. While these testing devices do give a satisfactory sampling of each manufacturing run, each individual cup is not tested and a substantial number of defective cups may be produced before a defect is discovered in the sampling process.

Accordingly, it is an object of this invention to provide a new and improved apparatus for testing relatively fragile cups.

It is a further object of this invention to provide improved apparatus for automatically testing each individual cup after it is manufactured without destroying or harming the cup so that is is available for sale.

A still further object of this invention is to provide improved apparatus for testing and sorting cups which is able to process the cups at a high rate of speed.

SUMMARY OF THE INVENTION

In carrying out the above objects the invention features in a first embodiment a nonporous, resilient, thin membrane having an annular contact area for receiving the rim of the cup. The membrane is fixedly supported only along the inner and outer edges of the annular contact area leaving the membrane movable in the contact area. An air impervious means spans the area defined by the inner edge of the annular contact area and includes an upwardly extending frustrum-shaped mandrel for guiding a rim of a cup into sealing alignment with the annular contact area of the membrane.

The air pressure within the cup in place on the membrane is reduced to cause the rim of the cup to displace the entire annular contact area downwardly to effect a seal between the rim and the membrane when there are no defects in the cup. Since the membrane is very thin and very elastic to accommodate a fragile cup, separate means is provided for returning the contact area of the membrane to a substantially flat condition after each downward deflection and for providing a positive seal breaking action between the membrane and the cup. The extremely elastic membrane tends to maintain an adhering contact with the rim of the cup even though the pressure within the cup has been balanced with the ambient pressure outside of the cup and there is no external force being exerted on the cup to maintain the contact with the membrane.

In a second embodiment of the teachings of this invention a frustrum-shaped mandrel is provided for receiving and supporting a cup. A nonporous, resilient, thin membrane skirt extends outwardly from and around the periphery of the lower portion of the mandrel to contact a lower portion of the cup supported on the mandrel. Air pressure within the cup is reduced through a passage formed through the interior of the mandrel. Again, it is desirable to provide a separate means for positively breaking the contact between the membrane and the rim area of the cup after the test has been completed. In this instance a spring biased means is disposed between a top surface of the mandrel and the inner bottom surface of a cup to yieldingly urge the cup away from the mandrel when pressures within and outside the cup drop to a predetermined pressure differential. A preloading device is operable to overcome the force of the spring biasing means, when air pressure is reduced within a cup, to enable the lower portion of the cup to be disposed adjacent the membrane skirt and to permit a seal to be effective between the skirt and the cup.

Conveyor, index table or other means are provided for moving the individual leak testing devices from a cup-receiving station past a waste discharge station to a packaging station. The air pressure reducing means is operable between the cup receiving and waste discharge stations. The waste discharge station is spaced a sufficient distance from the point of operation of the air pressure reducing means to enable a leak test to be performed before the cup arrives at the waste discharge station. The waste discharge station preferably includes pneumatic tube conveyor means having a receiving mouth disposed sufficiently close to the path of movement of the leak testing device to remove a defective cup with suction forces.

The air pressure within a cup is equalized with the ambient air pressure after an individual leak testing device has passed the waste discharge station to break the sealing forces of atmospheric pressure holding a cup against a membrane. The packaging station also preferably includes a pneumatic tube conveyor means having a receiving mouth disposed sufficiently close to the path of movement of the individual leak testing device to remove a cup with suction forces.

Other objects, advantages, and features of this invention will become apparent when the following description is taken in conjunction with the accompanying drawings, in which:

DESCRIPTION OF THE PREFERRED EMBODIMENTS

Figure 1:
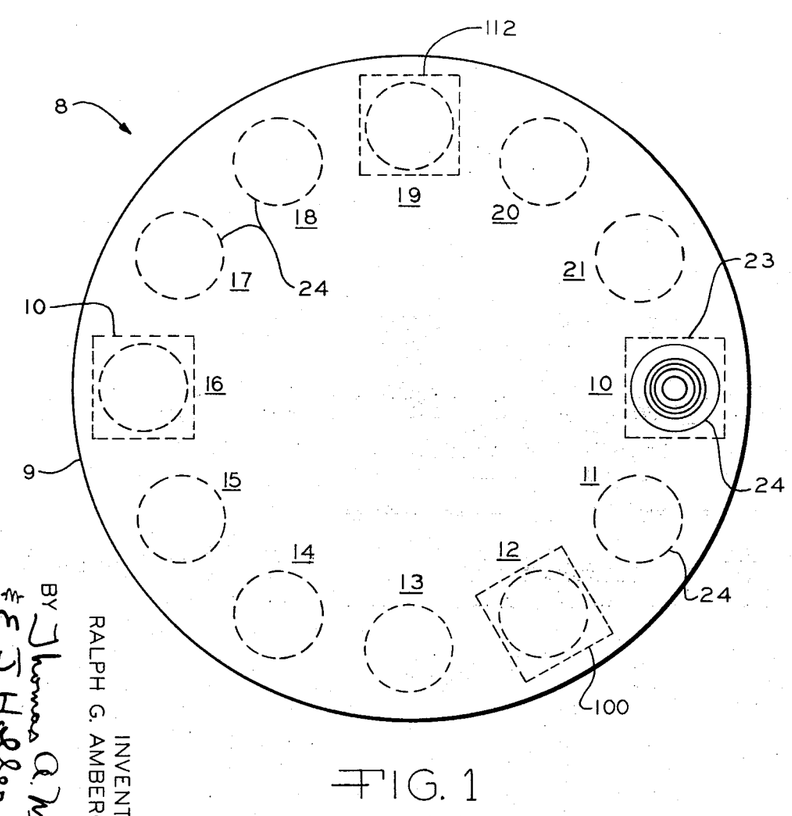
FIG. 1 is a plan view of an indexing table carrying a plurality of individual leak testing devices.

Referring to FIG. 1 there is illustrated apparatus designated generally at 8 for processing simultaneously a plurality of cups through a testing operation. An indexing table 9 indexes a plurality of individual leak testing devices 24 from stations 10 through 21. The index table 9 moves the devices 24 from a cup-feeding mechanism 23 past a preloading apparatus 100, a waste discharge mechanism 110, and a packaging discharge mechanism 112.

Figure 2:
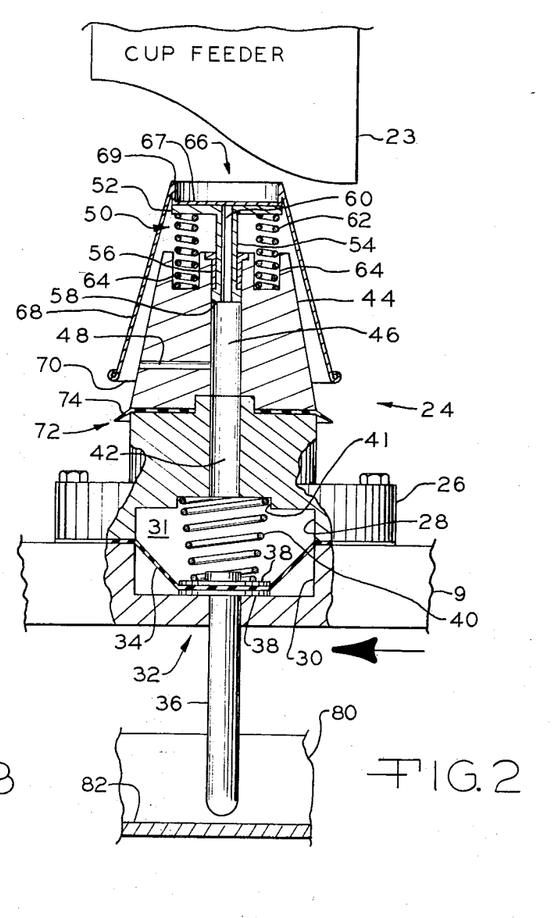
FIG. 2 is a side elevational view, partially in section, of an individual leak testing device at a loading or cup feeder station.

Referring to FIG. 2 an individual leak testing device is illustrated in detail beneath a cup-feeder means 23. A cup feeder tube 23 is connected to apparatus for individually feeding cups to the tester 24 when the tester is moved beneath the chute 23, in a manner known in the art.

Figure 3:
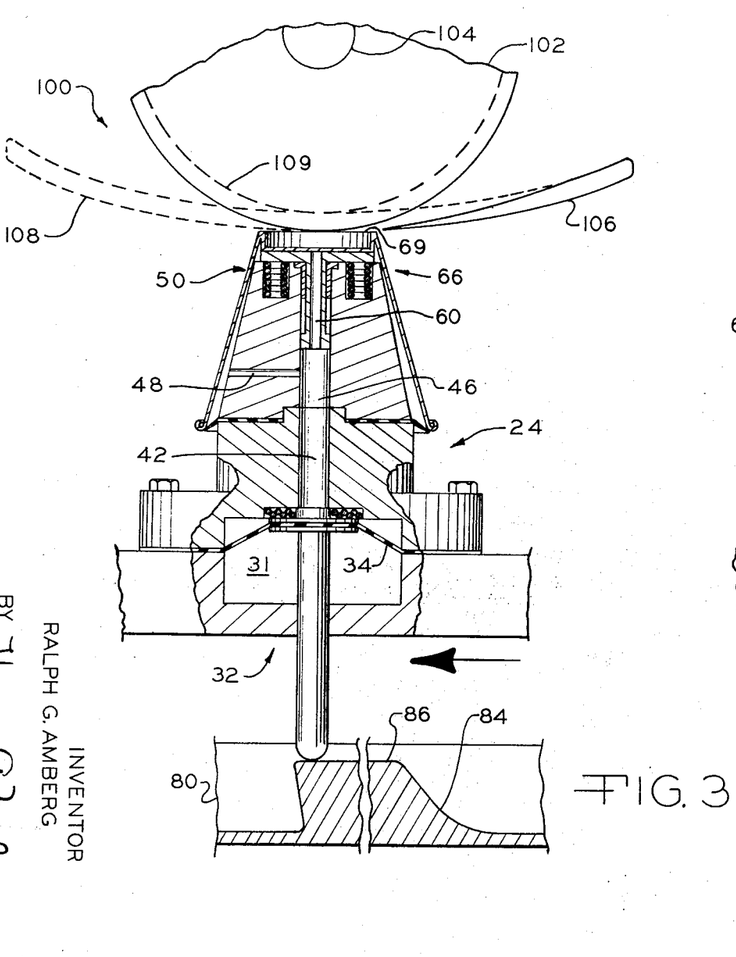
FIG. 3 is a side elevational view, partially in section, of an individual leak-testing device in operation at a preloading station.

The individual tester 24 includes a tester base 26 having a cavity 28 formed therein which registers with a cavity 30 formed in the index table to provide a diaphragm chamber 31. A pressure reducing means is indicated generally at 32 and includes a diaphragm 34 having a cam follower shaft 36 secured thereto by plates 38. A spring 40 is seated in a spring seat housing 41 formed in the tester base 26 and extends between the housing 41 and the upper plate 38. The spring 40 yieldingly urges the plate 38 and thus the diaphragm 34 to the lower position shown in FIG. 2. The cam follower shaft 36 registers with and follows a cam track 80 having a cam surface 82. When the cam surface moves closer to the tester the cam follower shaft 36 urges the plates 38 and thus the diaphragm 34 to an uppermost position (as seen in FIG. 3).

A mandrel 44 is secured to an upwardly extending portion of the tester base 26 and is frustrum-shaped to receive and guide a cup 66 into a desired position. A vertical passage 46 and a horizontal passage 48 are formed in the mandrel, both communicating with a passage 42 formed in the tester base 26 which opens into the diaphragm chamber 31.

An ejector means is designated generally at 50 and includes an ejector plate 52 for contacting an inner surface of a bottom 67 of the cup 66. The ejector plate 52 is supported on an ejector shaft 54 which is slidably mounted in an ejector bearing 56 seated in mandrel passage 46. The ejector shaft 54 has a collar 58 formed on the lower portion thereof to retain the ejector shaft in the passage 46 and to limit the upward movement thereof. A passage 60 is formed in the shaft 54 and communicates via passages 46, 42 with the diaphragm chamber 31. Ejector springs 62 are disposed between the ejector plate 52 and spring seats 64 formed in the top surface of the mandrel 44. The springs 62 are preloaded to normally yieldingly urge the ejector plate 52 to the position shown in FIG. 2. The ejector plate 52 may be perforated, star shaped, have ribs on the top, or otherwise formed to expose the bottom of the cup to the reduced pressure for testing.

A cup 66 is shown received in an inverted position over the ejector plate 52 and the mandrel 44. The cup 66 has a bottom 67, side wall 68, a bottom rim 69 and a top rim 70.

An annular nonporous, resilient, thin membrane 72 is supported between the mandrel 44 and the tester base 26 and has a skirt portion extending from and around the periphery of the lower portion of the mandrel 44. The membrane 72 has an outwardly extending annular contact area 74 for receiving the rim area of cup 66 and, when the ejector means is preloaded as will be described hereinafter, establishes continuous contact with a cup surface extending around the cup adjacent the rim area in a closed loop. The annular contact area is fixedly supported only at the inner edge thereof. The annular contact area is preferably formed in this embodiment with an upper surface shaped as a frustrum to accommodate different size cup mouths and to guide the cup rim into continuous contact. The portion of the membrane having the annular contact area may be feathered from a greater thickness adjacent its supported edge to a smaller thickness at its outer edge to enhance the flexibility to assure contact with an irregular rim and to reduce the pressure necessary to provide a good seal to avoid possible cup damage. In an experimental embodiment the preferred thickness of the membrane along its supported inner edge of the annular contact area was one thirty-second of an inch.

The operation of the apparatus 8 is illustrated in FIGS. 2 through 5. In FIG. 2, when the tester 24 is indexed in the position beneath the cup feeder 23, a cup is discharged in response to the arrival of the tester 24. The table 9 is indexed to take the tester 24 with the cup thereon to station 11 and then to a preloading means generally indicated at 100 in FIG. 3 which may be positioned at station 12. By providing an intermediate station before preloading the testing device, the cup is given an opportunity to obtain a preliminary alignment on the ejector plate 52 before the preloading operation is effected.

Referring to FIG. 3, as the tester 24 is indexed from station 11 to station 12 the leading edge of the bottom rim of the cup 69 contacts a deflector 106. The leading contact surface of the deflector 106 is positioned above the height of the bottom rim 69 of the cup as supported upwardly by the ejector means 50. The trailing edge of the deflector 106 is positioned just above the final preloaded position of the bottom rim 69 of the cup as shown in FIG. 3. As tester 24 moves into station 12 the cup bottom rim 69 is gradually pushed downwardly and, in turn, preloads the ejector means 50 by compressing springs 62.

It is advantageous to utilize a roller 102 for the final preloading adjustment and alignment. A roller 102 is preferably formed from material which has some resilience and which will not damage the cup bottom rim 69, e.g., hard rubber, and is mounted on a shaft 104. The shaft 104 may be journally supported for free rotation. As the leading edge of the bottom rim 69 of the cup leaves the trailing edge of the deflector 106 the outer periphery of roller 102 contacts the rim 69 and as the contact area moves to the central tangential point with the plane defined by the rim 69 the final adjustment is effected. The rolling action of the outer periphery of roller 102 enables the inverted cup to have its rim and the contacting ejector plate 52 positioned substantially horizontally avoiding any cocking that might occur with a rubbing shoe.

At the same time as the ejector means 50 of the tester 24 is being preloaded, the cam surface 82 of the cam track 80 has pushed the cam follower shaft 36 upwardly to the position shown in FIG. 3 via the inclined cam surface 84 to a plateau cam surface 86. Most of the air in diaphragm chamber 31 is pushed out of the chamber through the passages 42, 46, 48, through the interior of the cup and between the cup rim and the membrane. Similarly, excess air in the cup 66 is also pushed out of the cup between the cup rim 77 and the membrane 72. The frustrum-shaped annular contact area of the membrane aids in the exhausting of air between the cup and membrane since the membrane surface is inclined toward the direction the air is exiting. Conversely, this inclination of a membrane surface assists in preventing air from returning to the interior of the cup later since it will now act as a flap or check valve.

Figure 4:
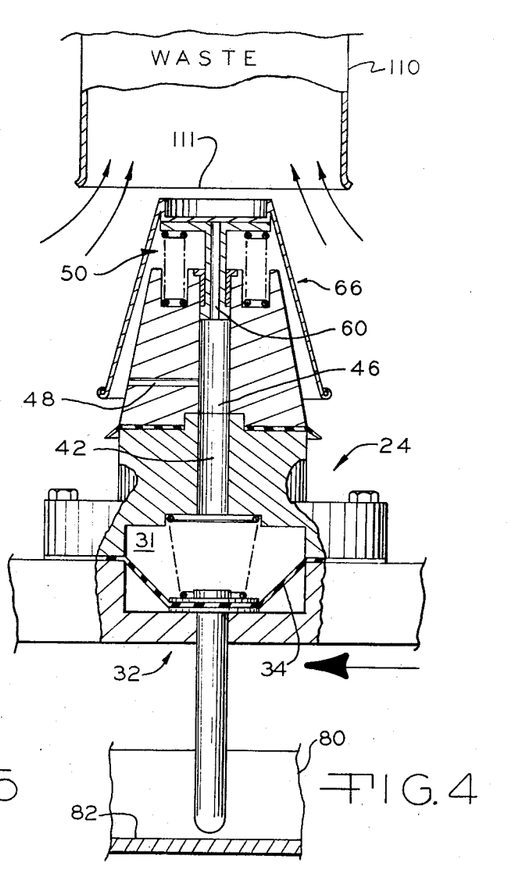
FIG. 4 is a side elevational view, partially in section, illustrating an individual leak testing device at a waste discharge station.

As the tester apparatus 24 leaves the preloading station 12 the cam follower shaft 36 is moved off of the cam plateau surface 86 and returns to the position illustrated in FIGS. 2 and 4 wherein the end of the cam follower shaft 66 is fully extended. The spring biasing of the cam follower shaft 36, the diaphragm retaining plates 38 and the diaphragm 34 to the bottom of the diaphragm chamber creates a reduced pressure area within the cup. The upper portion of the test base 26, the lower portion of the mandrel 44, and the supported portion of the membrane 72 therebetween provides an air impervious surface across the area defined by the inner edge of the annular contact area of the membrane. As a result atmospheric pressure pushes down on the bottom 67 of the cup and against the lower surface of the membrane 72 to cause the membrane to effect a sealing with a closed loop surface extending around the entire periphery adjacent the rim 70 of the cup 66.

Although the ambient air is seeking to enter the interior of the cup it is prevented from doing so unless the cup has a leak in the wall or the bottom thereof, or unless the rim is irregular beyond the tolerance designed into the membrane 74 and admits air around the rim. The pressure reducing means 34 creates a pressure differential between the interior of the cup and the ambient atmosphere so the ambient atmosphere exerts a force greater than that exerted by the springs 62 of the ejector means 50.

Since the cups are designed to hold liquid it is not necessary that the tester device 24 or the cup 66 be able to maintain the pressure differential indefinitely. That is, under reduced pressure conditions air may permeate or otherwise move through the walls of some materials so that eventually equilibrium between the inside and outside pressures would be established. However, unless the perviousness of the cup material is sufficient to pass liquids the degree of air permeability of the cup material is not of interest.

As an alternative structure to that shown in solid lines in FIG. 3, a preloading structure may be utilized in which the deflector 106 is extended as shown in dotted lines 108 to provide a deflector plate extending past the final lowest preloading adjustment point. The diameter of the roller 102 may be then reduced to that shown at 109. The roller 102 may then be urged against the top of the deflector 108 by gravity or by spring biasing. Further, the deflector plate 108 may be yieldingly supported, in the adjustment position shown, by springs or gravity. In either instance, gravity or the spring means will exert a force which is sufficient to overcome the oppositely directed force of springs 62 of the ejector means 50 to urge plate 52 downwardly against the top of the mandrel 44. No damage will occur to the cup bottom rim 69, to the ejector means 50, or to the preloading means if the bottom rim 69 extends higher or lower than a predetermined average adjustment point.

Referring now to FIG. 4, the leak tester 24 is shown at the waste discharge station which may be placed at station 16. A waste pneumatic tube conveyor 110 has a mouth 111 positioned above station 18 and sufficiently close to the path of movement of the tester 24 so that if a defective cup has been detected the suction of the air entering the mouth 111 will be sufficient to lift the cup 66 from the tester 24 and convey it to a waste area.

If the cup 66 is a good cup it will still be retained in a sealing relationship with the membrane 72, the force of the atmosphere on the bottom of the cup and the distance of the bottom of the cup from the mouth 111 being sufficient to overcome the suction force exerted by the conveyor 110.

In this embodiment of the invention it was found that the time required to move between station 12 and station 16 was sufficient time to conduct a test of a cup to determine whether the cup would leak liquid or whether it had an irregularity beyond tolerance in the cup rim. If the pressure within and outside of the cup reaches a pressure differential which will enable the ejector means to push the cup up after it has passed station 16 the cup will still be adequate for containing liquid.

FIG. 4 exemplifies one of the features of this invention in that the positive ejection means 50 is operable not only to lift the bottom of the cup within range of the conveying forces of the tube 110, but also is operable to positively break the seal between the thin membrane 72 and the rim of a cup in response to a leak in the cup. If the positive eject means were not utilized, the flexibility and thinness of the membrane 72 is necessarily such that even though air pressure inside and outside of the cup had reached an equilibrium, the flexible membrane 72 may still maintain an adhering contact to the rim of the cup. Thus, even if the tube 110 were positioned just above the cup bottom 69 the suction forces would not be sufficient to remove the cup from the tester 24.

Figure 5:
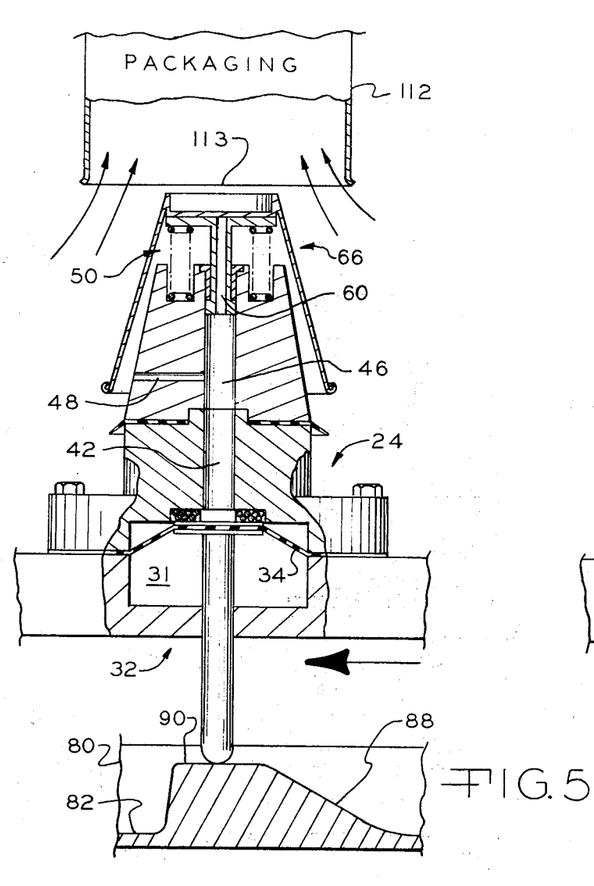
FIG. 5 is a side elevational view, partially in section, of an individual leak testing device at a packaging station.

Referring now to FIG. 5, a tester 24 is shown at station 19 beneath a pneumatic packaging tube conveyor 112 having a mouth 113 positioned to receive the cup 66.

As the tester 24 moves into station 19 an inclined cam surface 88 raises the cam follower shaft 36 to the level of the cam plateau surface 90. This positively equalizes the air pressure within and without the cup 66 and permits the positive eject means 50 to break the adhering contact between the membrane 72 and the rim 70 of the cup 66. Moreover, the positive eject means 50 raises the cup 66 within the effective range of the air current entering the mouth 113 of the pneumatic conveying tube 112. When the cup 66 enters the tube 112 it is conveyed to a packaging machine or area.

Figure 6:
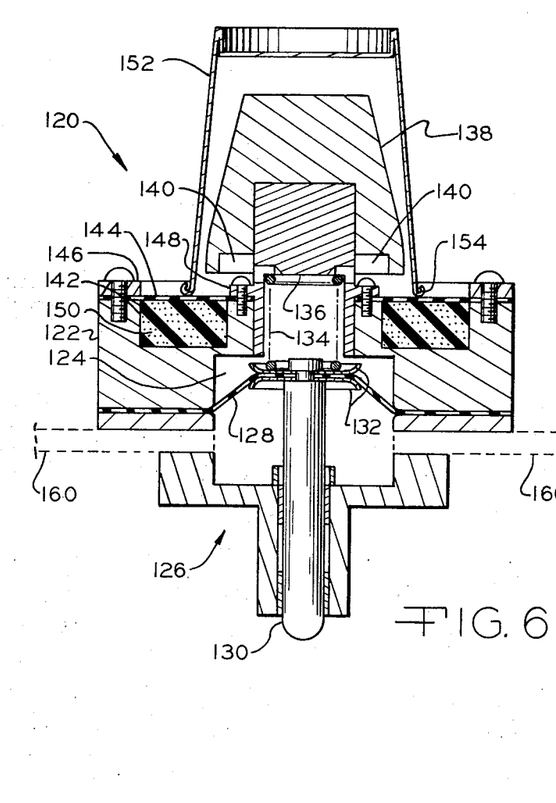
FIG. 6 is a side elevational view of a second embodiment of the teachings of this invention illustrating in cross section another type of individual leak testing device.

Referring to FIG. 6 there is shown a cross-sectional view of a second embodiment of a leak test device designated at 120. A base member 122 has a diaphragm chamber 124 formed therein. A pressure reducing means 126 includes a diaphragm 128 mounted for up and down movement in chamber 124 in response to movement of a cam follower shaft 130, secured to the diaphragm by plates 132. A spring 134 biases the plates 132 and thus the diaphragm 128 to the position shown in dotted lines at the bottom of the chamber 124. The spring is retained in position by a spring seat housing 136 formed in the base 122.

A frustrum-shaped mandrel 138 is mounted above and on the tester base 122 and has passages 140 formed therein permitting communication between the diaphragm chamber 124 and the area surrounding the mandrel 138 via the spring housing 136.

An annular plenum cavity 142 is formed in the upper side of the base 122. An annular membrane 144 extends across the cavity 142 and has an upwardly facing annular contact area for receiving the rim area 154 of an inverted cup 152 to establish continuous contact with a cup surface extending around the cup adjacent to the rim area in a closed loop.

The annular membrane 142 is supported at both the outer and inner edges of the annular contact area by annular plates 146 and 148. The membrane between the fixedly supported edges thus remains movable. The membrane is a nonporous, resilient, thin material to attain effective sealing with the cup rim 154 without damage to the cup or the membrane. Experimental results have indicated that a preferred material is pure gum rubber having a thickness of one thirty-second of an inch.

Figure 7:
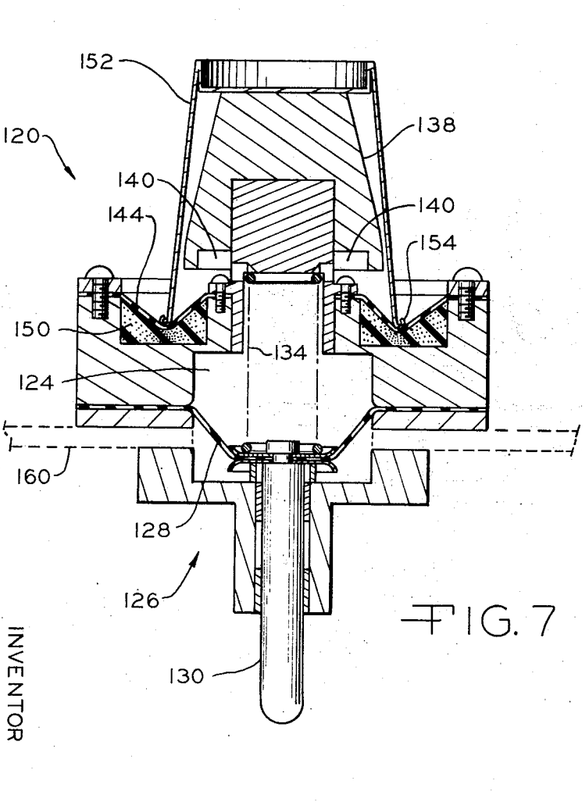
FIG. 7 is a cross-sectional view of the apparatus shown in FIG. 6 illustrating the device during the testing operation.

As shown in FIG. 7, the cam follower shaft 130 may be actuated by a cam surface similar to that illustrated in FIGS. 2 through 5 to perform the operations required. When the pressure is reduced within the cup by the movement of the cam follower shaft 130 in the diaphragm 134 to the position shown in FIG. 7, the greater atmospheric pressure pushes on the bottom of the inverted cup 152 causing the rim 154 to deflect the annular contact area of the membrane 144 downwardly. Because the membrane is thin and made of very elastic material the rim 154 literally buries in the surface of the gum rubber enabling a seal which follows the rim configuration very closely and will conform to any small irregularities, such as lapped seams, that are to be tolerated in the final product.

If there are no leaks or major irregularities in the cup being tested it will remain in the position illustrated in the FIG. 7 until the cam shaft 130 is actuated upwardly at a packaging discharge station to equalize the pressure on the inside and the outside of the cup. If the cup is defective, air pressure within and on the outside of the cup will equalize before the tester 120 arrives at a waste discharge station.

Because the cups being tested are relatively fragile, it has been necessary to use a membrane material such s pure gum rubber and to suspend that membrane from at least one edge, as illustrated in the first embodiment, or from two edges as illustrated in FIG. 7. No fixed support may be provided behind the membrane or the cup will be termed defective whether or not a real defect in fact exists. The nature of the material of such a membrane is such that even after pressure is equalized between the interior and exterior of a cup the membrane may in some cases tend to cling or to maintain an adhering contact with the surface of the membrane. To overcome this an air or gas plenum has been provided behind the membrane containing a gas having a pressure at least equal to ambient air pressure therein. A pressure slightly above atmospheric pressure will make more positive the return of the membrane to a cup receiving position. Either pressure selected will break the adhering contact between the rim and the membrane.

It is also desirable to use a positive return mechanism since repeated stretching of the contact surface may fatigue a sensitive membrane material or may result in very slight semi-permanent deformations, particularly when cups having the same diameter rim are the only ones being tested. The air or gas restrained in the plenum 142 pushes up on the lower surface of the membrane to help return the membrane upper surface to a flat condition and to smooth out potential deformations in the surface which might interfere with the testing operation.

In some designs air in free form might result in the strecting of other areas of the membrane, not touching the rim during deformation of the membrane, seeking to escape as the pressure in the plenum is increased. As an alternative, air or gas in encapsulated form may be used. Any one of a number of very flexible, light cellular structures is suitable, for example, a very light and flexible sponge rubber. The encapsulation of the air by the cellular structure limits the tendency of the gas to cause the areas of the membrane not contacting the rim to stretch in an opposite direction. Moreover, the upper, outer surface defined by the layer of cellular material 150 at rest as shown in FIG. 6, provides a mark to which the surface returns repeatedly after being compressed. Thus the annular contact area of the membrane 144 is repeatedly being returned to a rim receiving position, deformations tend to be smoothed out, and the adhering contact between the membrane and the rim of the cup is positively broken.

The tester 120 is shown as being supported and moved by a diagrammatically designated upper run 160 of a suitable conveyor. A cup may be fed to a position over the mandrel 138 by gravity when the tester 120 is on the upper run 160. It has been discovered that with the cited materials for the membrane with an air plenum means disposed therebeneath, that preloading of the cup is not required. That is, the force of gravity alone is sufficient in the embodiment illustrated in FIGS. 6 and 7 to establish enough contact between the cup rim 154 and the annular contact area of the membrane 144 so that operation of the pressure reducing means provides a sealing contact and enables the test to be performed.

A waste discharging station is located on the lower run of the conveyor and, if the cup is defective, the seal will be broken by the mechanisms described and the cup will fall into a waste disposing means. If the cup is not defective it will be retained in the position illustrated in FIG. 7, even though the tester 120 has been inverted, until the tester arrives at a packaging discharge station. The cam follower shaft 130 is then actuated to the position shown in FIG. 6 to restore equilibrium between the pressures inside and outside of the cup. The cup will then fall from the tester 120 to be conveyed to a packaging machine or area.

Figure 8:
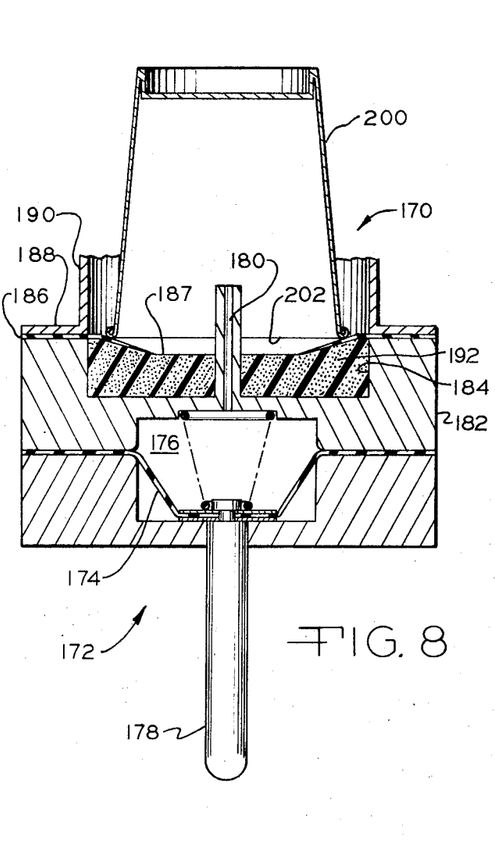
FIG. 8 is a cross-sectional view of a third embodiment of the teachings of this invention.

Referring to FIG. 8 there is illustrated a third embodiment of the teachings of this invention in which an individual tester designated at 170 includes a pressure reducing means indicated generally at 172 having a diaphragm 174 actuatable in a diaphragm chamber 176 by a cam follower shaft 178 in the manner described hereinbefore. A passage 180 in the tester body provides communication between the diaphragm chamber and the interior of a cup to be tested.

An annular cavity 184 is formed in the upper side of the tester body 182. An annular membrane 186 of material similar to that described hereinbefore is disposed so that an annular contact area will receive a rim 202 of a cup 200. The outer edge of the annular contact area of the membrane 186 is fixedly supported between an annular plate 188 and the tester body 182. A cylindrical wall 190 may extend upwardly from the plate 188 to guide the rim of the cup into the proper alignment with the annular contact area of the member 186.

The annular contact area of the membrane 186 defines an inverted frustro-conical or funnel-shaped surface to help guide the rim 202 into alignment for sealing. The membrane 186 may have a thickness decreasing from adjacent the supported edge and feathered toward the unsupported or inner edge to enhance the flexibility of the membrane and its sealing capabilities. The area defined by the inner edges of the annular contact area may be connected by a very thin web 187.

The annular cavity beneath the membrane 186 and the web 187 may again serve as an air plenum as discussed with respect to FIGS. 6 and 7. Alternately, as also discussed hereinbefore, the air may be encapsulated in a cellular or spongy material as illustrated by the layer 192. In this instance the web 187 is not necessary. The upper surface of the gas encapsulating cellular material is shaped to conform to the lower surface of the membrane 186 to provide the advantages discussed hereinbefore. By the choice of correct materials and by controlling the thickness of the membrane 186, a preloading operation will not be necessary with the embodiment of FIG. 8.

The steps of testing, preloading, waste discharge, and packaging discharge may be carried out in the manner already disclosed. The embodiments shown in FIGS. 6 and 8 will more readily accommodate a larger variety of cup sizes.

Figure 9:
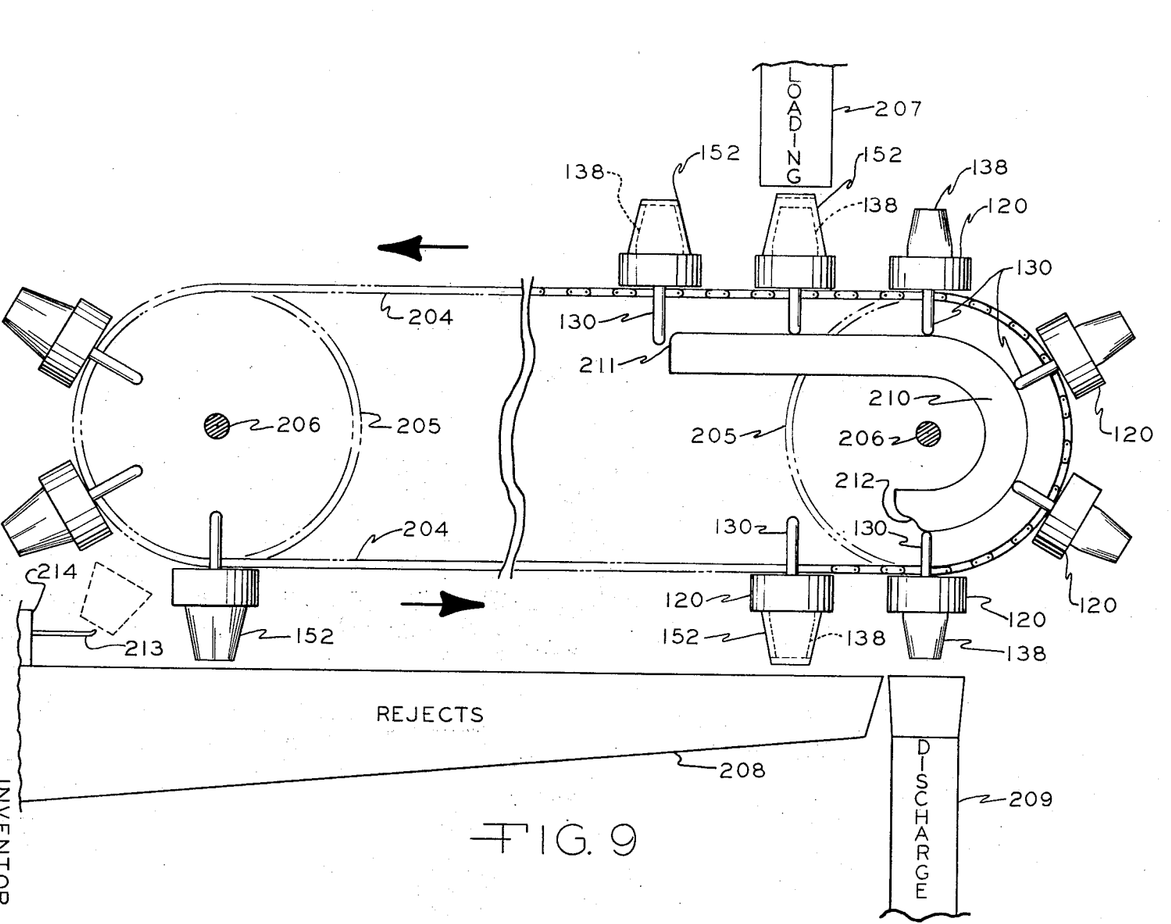
FIG. 9 is a diagrammatic side elevational view of a conveyor system for indexing the cup testing devices between stations.

Referring to FIG. 9 there is illustrated a conveyor system useful with the embodiments of testing devices described herein, the testor shown in FIGS. 6 and 7 being chosen as an example.

A pair of spaced conveyor chain or belt means 204 carry a plurality of test devices 120 supported between and on the chain or belt 204. Each chain or belt 204 is trained around spaced drive sprockets or pulleys 205 which are rotated on shafts 206.

The conveyor system indexes the testing devices 120 in a known manner to a position beneath a loading station above the upper runs of the chains 204, where a loading mechanism 207 dispenses the cups 152 one at a time onto the mandrel 138 of each testing device 120.

A cam track 210 is positioned inwardly from the periphery of the runs of the conveyor and is engageable with the cam followers 130 extending inwardly between or through the conveyor means to control the action of the internal diaphragm of each tester. After a cup 152 is placed on a mandrel 138 of a tester 120, an indexing action of the conveyor system will move the cam follower 130 past a cam declination or drop-off 211 of the cam track 210. The spring biased cam follower 130 thus moves away from the tester 120, pulling the internal diaphragm away from the mandrel, to create a partial vacuum within the cup on the mandrel.

The pressure within the cup 152 is then monitored when conveyor chains 204 carry the testing device around the sprocket 205 to the initial portion of lower run of the conveyor. If a cup is defective and has lost the partial vacuum created therein, then the cup 152 will fall off of the mandrel 138 as the device 120 is being or is inverted by the conveyor, into a reject chute 208.

If the partial vacuum is maintained by a good cup, then the cup will be held on the mandrel by the vacuum until a discharge station adjacent a subsequent portion of the lower run is reached. An inclination 212 on the track 210 will urge the cam follower 130 toward the testing device 120, releasing the partial vacuum within the cup, and allowing gravity forces to pull the cup into a discharge means 209. A pneumatic tube conveyor may be used as a receiver at the discharge station to convey the good cups to a packaging area.

It may be desirable in some instances to monitor the pressure within the cup after a partial vacuum has been created therein, to determine whether something less than all of the partial vacuum is lost. For example, the cup may have a defect which permits a loss of vacuum at an initially faster rate and then, as the difference between the pressure exterior to and within the cup diminishes to a certain difference, the loss of a vacuum is at a slower rate or stops completely. This would enable a cup with an intermittently operating defect to be carried to the discharge means 209 for ejection and collection with good cups.

A seam leak wherein a cup formed from a plastic coated paper or other material which has sufficient spring action to enable the material to act as a differential flap valve may provide an intermittently operating defect. A slow leak may permit some loss of the partial vacuum but inable the cup to stay on the mandrel until the discharge station is reached. If the membrane material is of a material which tends to engage or grip the rim of a cup as the vacuum is lost very slowly, particularly as the membrane is used for repeated test operations, enough engagement may be maintained by the gradual release of the stretched membrane around the rim to retain the cup until the discharge station is reached.

In any of the examples in the preceding paragraph some of the partial vacuum in the cup may be lost even though the cup is not ejected into the reject chute. Thus when certain liquids, or liquids with certain temperatures, are placed in the cup later, there may be a leak.

When there is some, but not total, loss of the partial vacuum the cup will move relative to the tester device 120 away from the cup position shown in FIG. 7 toward the cup position shown in FIG. 6. Resilient or yielding monitoring finger means 213 supported by bracket means 214 may be placed adjacent the path of a cup after a partial vacuum has been created within a cup. As noted by the cup position shown in dotted lines adjacent the finger means 213, a cup in which there has been little or no loss of the partial vacuum will miss the monitoring fingers and will be carried to the discharge station.

If there has been a predetermined loss of vacuum (determined by the spacing of the monitoring fingers from the cup path), the finger means will engage the bottom of the cup to tilt the cup with respect to the tester and cause a total loss of the partial vacuum. The cup will then fall from the mandrel into the reject chute 208.

The means for monitoring the pressure within the cup, or on the cup adjacent side of the air impervious membrane, includes means for detecting the loss of all or only part of the partial vacuum within the cup. In the embodiment shown in FIG. 9, monitoring is accomplished by inverting the tester device 120 alone, or in conjunction with the monitoring finger means 213. In the embodiment shown in FIG. 4, monitoring may be accomplished by the removal of a cup by the suction tube means 110 in which a total loss of the partial vacuum in the cup has occurred. Alternatively, monitoring may also be accomplished by the adjustment of the amount of suction force exerted by the suction tube means 110 so that if part of the partial vacuum with the cup has been lost the suction force from tube means 110 combine with the spring force of springs 62 to overcome the remaining seal between the rim area or mouth of the container and the skirt 72.

It should be noted again that when reference is made to a seal between a mouth or rim of a cup and the membrane, the rim seal is around the open end of the cup including the open end surface and the side wall portion adjacent thereto.

In conclusion, it is pointed out that while the illustrated examples constitute practical embodiments of my invention, I do not limit myself to the exact details shown since modification of these details may be made without departing from the spirit and scope of this invention.

I claim:

1. Apparatus for sorting relatively fragile cups manufactured from coated paper, thin plastic or foamed plastic material and the like comprising
    a. a nonporous, resilient, thin membrane having an annular contact area for receiving the rim area of a cup and establishing continuous contact with a cup surface including irregularities therein extending around the cup adjacent the rim area in a closed loop, said membrane having deformation characteristics in response to differential pressure between the interior and exterior of a cup being tested which enables the membrane to establish and normally maintain a clinging contact with the cup rim including any irregularities therein after equalization of interior and exterior pressures on the cup,
    b. means for fixedly supporting said membrane only outside of the contact area and around at least one edge thereof leaving the membrane movable throughout said contact area, c. air impervious means spanning the area defined by an inner edge of said annular contact area of said membrane, d. means for reducing air pressure on the cup-adjacent side of said air impervious means below the ambient air pressure to cause relative movement toward each other of said annular contact area of said membrane and a closed loop surface of a cup received on the membrane to enable the membrane to establish a seal between the membrane and said cup surface in which the thin membrane may conform with irregularities in said cup surfaces, and e. means for monitoring the pressure on the cup-adjacent side of said air impervious means to sort good cups from defective cups.

2. Apparatus as defined in claim 1 in which said monitoring means includes ejector means for exerting pressure against a cup to positively prevent and to break a seal between said membrane and a cup unless a predetermined pressure difference exists between the ambient atmosphere and the cup-adjacent side of said air impervious spanning means.

3. Apparatus as defined in claim 1 in which said ejector means includes spring means disposed to act between said air impervious spanning means and a bottom inner surface of a cup.

4. Apparatus as defined in claim 2 which further includes means for pre-loading said ejector means comprising means for urging a cup toward said membrane when air pressure is reduced on the cup-adjacent side of said air impervious spanning means.

5. Apparatus as defined in claim 1 in which said membrane is fixedly supported only along an inner edge of said annular contact area and extends outwardly therefrom.

6. Apparatus as defined in claim 5 in which the cup-adjacent side of the supported portion of said membrane is frustrum-shaped to enable better contact with a closed loop surface of a cup.

7. Apparatus as defined in claim 1 in which said membrane is fixedly supported along only one of the edges of said annular contact area, and in which the thickness of the membrane decreases from the supported edge toward the unsupported edge to chance the ability of the membrane to form a seal with a closed loop surface of a cup.

8. Apparatus as defined in claim 1 in which said membrane is fixedly supported along only one of the edges of said annular contact area, and in which the annular contact area surface is inclined with respect to the plane defined by the rim of a cup to enable better contact with a closed loop surface of a cup.

9. Apparatus as defined in claim 1 in which said membrane is fixedly supported along both the inside and outside edges of said annular contact area.

10. Apparatus as defined in claim 1 in which said membrane is formed from pure gum rubber and has a thickness of less than three thirty-seconds of an inch throughout the annular contact area.

11. Apparatus for sorting relatively fragile cups manufactured from coated paper, thin plastic or foamed plastic material and the like comprising a. a nonporous, resilient, thin membrane having an annular contact area for receiving the rim area of a cup and establishing continuous contact with a cup surface extending around the cup adjacent the rim area in a closed loop, b. means for fixedly supporting said membrane only outside of the contact area and around at least one edge thereof leaving the membrane movable throughout said contact area, c. air impervious means spanning the area defined by an inner edge of said annular contact area of said membrane, d. means for reducing air pressure on the cupadjacent side of said air impervious means below the ambient air pressure to cause relative movement toward each other of said annular contact area of said membrane and a closed loop surface of a cup received on the membrane, and e. means for monitoring the pressure on the cup-adjacent side of said air impervious means to sort good cups from defective cups, f. said monitoring means including ejector means for exerting pressure against a cup to positively prevent and to break a seal between said membrane and a cup unless a predetermined pressure difference exists between the ambient atmosphere and the cup-adjacent side of said air impervious spanning means, g. said ejector means including closed gas plenum means located on the side of said membrane opposite to said annular contact area side, said gas plenum means having a surface means adjacent said membrane which is deformable in response to membrane movement to compress gas in said plenum.

12. Apparatus as defined in claim 11 in which said gas plenum means comprises spongy material having cells formed therein containing said gas.

13. Apparatus for sorting relatively fragile cups manufactured from coated paper, thin plastic or foamed plastic material and the like comprising a. a nonporous, resilient, thin membrane having an annular contact area for receiving the rim area of a cup and establishing continuous contact with a cup surface extending around the cup adjacent the rim area in a closed loop, b. means for fixedly supporting said membrane only outside of the contact area and around at least one edge thereof leaving the membrane movable throughout said contact area, c. air impervious means spanning the area defined by an inner edge of said annular contact area of said membrane, d. means for reducing air pressure on the cup-adjacent side of said air impervious means below the ambient air pressure to cause relative movement toward each other of said annular contact area of said membrane and a closed loop surface of a cup received on the membrane, and e. means for monitoring the pressure on the cup-adjacent side of said air imprevious means to sort good cups from defective cups, f. said membrane being fixedly supported only along an outer edge of said annular contact area and extending inwardly therefrom.

14. Apparatus as defined in claim 13 in which the cup-adjacent side of the unsupported portion of said membrane is funnel-shaped to enable better contact with a closed loop surface of a cup.

15. Apparatus for testing relatively fragile cups comprising,
  a. a nonporous, resilient, thin membrane having an annular contact area for receiving the rim of a cup and establishing continuous contact with a cup surface including irregularities therein, said membrane having deformation characteristics in response to differential pressure between the interior and exterior of a cup being tested which enables the membrane to establish and normally maintain a clinging contact with the cup rim including any irregularities therein after equalization of interior and exterior pressures on the cup,
  b. means for fixedly supporting said membrane along the inner and outer edges of said annular contact area leaving said membrane movable in said annular contact area in response to pressure thereon by a rim of a cup,
  c. air impervious means spanning the area defined by the inner edge of said annular contact area which includes an upwardly extending guide means for guiding a rim of a cup into contact with said annular contact area,
  d. means for reducing air pressure within a cup in place on said membrane to cause the rim of the cup to displace the entire membrane downwardly to effect a seal between the rim and said membrane in which the thin membrane conforms with irregularities in the cup surface, when there are no defects in the cup, and
  e. means for monitoring the pressure within the cup for sorting good cups from defective cups.

16. Apparatus as defined in claim 15 which further includes a layer of cellular sponge rubber on the side of said membrane opposite said annular contact area for returning said contact area of said membrane to a substantially flat condition after each downward deflection thereof and for providing a positive seal breaking action when air pressures within and outside of a cup equalize.

17. Apparatus for testing relatively fragile cups comprising,
  a. a nonporous, resilient, thin membrane having an annular contact area for receiving the rim of a cup,
  b. means for fixedly supporting said membrane along the inner and outer edges of said annular contact area leaving said membrane movable in said annular contact area in response to pressure thereon by a rim of a cup,
  c. air impervious means spanning the area defined by the inner edge of said annular contact area which includes an upwardly extending guide means for guiding a rim of a cup into contact with said annular contact area,
  d. means for reducing air pressure within a cup in place on said membrane to cause the rim of the cup to displace the entire membrane downwardly to effect a seal between the rim and said membrane, when there are no defects in the cup, and
  e. means for monitoring the pressure within the cup for sorting good cups from defective cups, including
  f. means for carrying said guide means in said generally upwardly extending direction to enable reception of an inverted cup thereon in contact with said annular contact area and to permit the reduction of pressure within said cup to effect a seal between the rim area of said cup and said membrane, and
  g. means for inverting said carrying means to detect the loss of reduced pressure within said cup.

18. Apparatus as defined in claim 17 in which
  a. said carrying the inverting means includes a conveyor having upper and lower runs, and which further includes
  b. cup loading means disposed adjacent said upper run of said conveyor,
  c. cup reject reception means disposed adjacent an initial portion of said lower run of said conveyor means, and
  d. good cup collection means disposed adjacent said lower run of said conveyor means subsequent to said reject reception means.

19. Apparatus for testing relatively fragile cups comprising
  a. a mandrel for receiving a cup telescoped thereover,
  b. a nonporous, resilient, thin membrane skirt extending outwardly from and around the periphery of a lower portion of said mandrel to contact a lower portion of a cup supported on said mandrel,
  c. means for reducing air pressure within a cup to move said skirt into sealing relationship with a cup whereby the thin membrane conforms to irregularities in the cup surface, and
  d. means for monitoring pressure within the cup to detect a leak in the cup.

20. Apparatus as defined in claim 19 in which said pressure monitoring means includes spring biased means disposed between a top surface of said mandrel and the inner bottom surface of a cup and yieldingly urging the cup away from said mandrel.

21. Apparatus as defined in claim 19 which further includes means operable to overcome the biasing of said spring biased means when air pressure is reduced within a cup to enable the lower portion of a cup to be disposed adjacent said skirt to permit a seal to be effected between said skirt and the cup.

22. Apparatus for leak testing containers comprising
  a. a very thin, nonporous, resilient membrane having a contact area substantially conforming in configuration to the mouth of a container to receive a container mouth and establish continuous sealing contact with the mouth surface including irregularities therein, said membrane having deformation characteristics in response to differential pressures between the interior and exterior of a cup being tested which enables the membrane to establish and normally maintain a clinging contact with the cup rim including any irregularities therein after equilization of interior and exterior pressures on the cup,
  b. means for fixedly supporting said membrane around at least one edge of and spaced from said mouth contact area leaving the membrane movable throughout said contact area,
  c. air impervious means spanning the area defined by an inner edge of the mouth contact area,
  d. means for creating a partial vacuum within said container with respect to the ambient air pressure to cause relative movement toward each other of said mouth contact area of said membrane and a container mouth received on said membrane and enable the very thin membrane to conform to irregularities of the container mouth, and
  e. means for detecting the loss of said partial vacuum in said container.

* * * * *

UNITED STATES PATENT OFFICE
CERTIFICATE OF CORRECTION

Patent No. 3,824,840        Dated July 23, 1974

Inventor(s) Ralph G. Amberg

It is certified that error appears in the above-identified patent and that said Letters Patent are hereby corrected as shown below:

Column 2, line 21, "mechods" should be - - methods - - .

Column 9, line 1, "s" should be - - as - - ;

line 31, "strecting" should be - - stretching - - .

Column 13, line 38, (Claim 6, line 2) "supported" should be - - unsupported - - ;

line 45, (Claim 7, line 5) "chance" should be                 - - enhance - - .

Column 14, line 10, (Claim 11, d.) "cupadjacent" should be

- - cup-adjacent - - .

Column 15, line 8, (Claim 15, line 8) "pressure" should be - - pressures - - .

Column 16, line 7, (Claim 18, line 2) "the" should be

- - and - - ;

line 52, (Claim 22, line 14) "equilization" should                 be - - equalization - - .

Signed and sealed this 3rd day of December 1974.

(SEAL)
Attest:

McCOY M. GIBSON JR.
Attesting Officer

C. MARSHALL DANN
Commissioner of Patents